US012571675B2

(12) United States Patent
Chiu et al.

(10) Patent No.: US 12,571,675 B2
(45) Date of Patent: Mar. 10, 2026

(54) ULTRASONIC SENSING ELEMENT ASSEMBLY AND ULTRASONIC SENSING ELEMENT

(71) Applicant: SonicMEMS (ZhengZhou) Technology Co., Ltd., Zhengzhou (CN)

(72) Inventors: Yi-Hsiang Chiu, Zhengzhou (CN); Rei Jinchi, Zhengzhou (CN); Hsien-Tsong Chen, Zhengzhou (CN)

(73) Assignee: SONICMEMS (ZHENGZHOU) TECHNOLOGY CO., LTD., Zhengzhou (CN)

( * ) Notice: Subject to any disclaimer, the term of this patent is extended or adjusted under 35 U.S.C. 154(b) by 373 days.

(21) Appl. No.: 18/479,550

(22) Filed: Oct. 2, 2023

(65) Prior Publication Data

US 2025/0044147 A1      Feb. 6, 2025

(30) Foreign Application Priority Data

Aug. 2, 2023    (TW) ................................. 112129158

(51) Int. Cl.
*G01H 11/08* (2006.01)

(52) U.S. Cl.
CPC .................................... *G01H 11/08* (2013.01)

(58) Field of Classification Search
CPC ...................................................... G01H 11/08

USPC ............................................................ 73/658
See application file for complete search history.

(56) References Cited

U.S. PATENT DOCUMENTS

2014/0008740 A1* 1/2014 Wang .................... B81B 3/0018
                                                        438/51
2020/0191646 A1* 6/2020 Jin ............................ B06B 3/00

* cited by examiner

*Primary Examiner* — Peter J Macchiarolo
*Assistant Examiner* — John M Royston
(74) *Attorney, Agent, or Firm* — MUNCY, GEISSLER, OLDS & LOWE, P.C.

(57) ABSTRACT

An ultrasonic sensing element assembly includes a semi-conductor substrate and a plurality of ultrasonic sensing elements on the semiconductor substrate and arranged in an array. Each of the ultrasonic sensing elements is in a sensing region of the semiconductor substrate. Each of the ultrasonic sensing elements includes a first sensing module with a first sensing unit and a second sensing unit connected in parallel, a second sensing module with a third sensing unit and a fourth sensing unit connected in parallel, four connection pads, and four welding pads. Each of the connection pads is in a through hole passing through a first surface and a second surface of the sensing region. The four welding pads are on the second surface of the sensing region and overlap vertical projections of the first sensing unit, the second sensing unit, the third sensing unit, and the fourth sensing unit respectively.

16 Claims, 5 Drawing Sheets

ULTRASONIC SENSING ELEMENT ASSEMBLY AND ULTRASONIC SENSING ELEMENT

CROSS-REFERENCE TO RELATED APPLICATION

This non-provisional application claims priority under 35 U.S.C. § 119 (a) to patent application No. 112129158 filed in Taiwan, R.O.C. on Aug. 2, 2023, the entire contents of which are hereby incorporated by reference.

BACKGROUND

Technical Field

The present invention relates to the field of sensing, and in particular, to an ultrasonic sensing element and an ultrasonic sensing element assembly.

Related Art

Currently, an ultrasonic sensing technology gradually becomes mature, and has been gradually extended to more application fields from conventional fingerprint recognition. A larger sensor area may be configured to sense a longer distance. Therefore, the ultrasonic sensing technology increasingly penetrates into the fields of displays, vehicles, and the like.

Since the product technology gradually becomes mature, how to improve optimal utilization of a wafer layout becomes the key of competition in cost.

SUMMARY

To solve the problem of the prior art, an ultrasonic sensing element assembly is provided herein, which includes a semiconductor substrate and a plurality of ultrasonic sensing elements. The semiconductor substrate includes a first surface and a second surface. The ultrasonic sensing elements are on the semiconductor substrate in an array. Each of the ultrasonic sensing elements is in a sensing region of the semiconductor substrate. Each of the ultrasonic sensing elements includes a first sensing module, a second sensing module, four connection pads, and four welding pads.

The first sensing module is on the first surface of the sensing region, and includes a first sensing unit and a second sensing unit. The first sensing unit is connected in parallel to the second sensing unit. The second sensing module is on the first surface of the sensing region, and includes a third sensing unit and a fourth sensing unit. The third sensing unit is connected in parallel to the fourth sensing unit. The first sensing unit, the second sensing unit, the third sensing unit, and the fourth sensing unit are in four corners of the first surface of the sensing region respectively, and are symmetrically arranged. Each of the connection pads is between two of the first sensing unit, the second sensing unit, the third sensing unit, and the fourth sensing unit and in a through hole passing through the first surface and the second surface of the sensing region. Two of the connection pads are connected to the first sensing module through lines, and the other two are connected to the second sensing module through lines. The four welding pads are on the second surface of the sensing region, and overlap vertical projections of the first sensing unit, the second sensing unit, the third sensing unit, and the fourth sensing unit respectively.

Each of the welding pads is connected to one of the four connection pads through a line.

In some embodiments, the first sensing unit, the second sensing unit, the third sensing unit, and the fourth sensing unit are piezoelectric micromachined ultrasonic transducers (PMUTs).

In some embodiments, each of connection pads is between two of the welding pads, and the two welding pads are symmetrically arranged with the connection pad as a center.

In some embodiments, the ultrasonic sensing element further includes a first dummy sensing unit, and the first dummy sensing unit is in a center of the first surface of the sensing region. In more detail, in some embodiments, an area of the first dummy sensing unit is smaller than those of the first sensing unit, the second sensing unit, the third sensing unit, and the fourth sensing unit.

In more detail, in some embodiments, the ultrasonic sensing element further includes a plurality of second dummy sensing units, and each of the second dummy sensing units is between two of the first sensing unit, the second sensing unit, the third sensing unit, and the fourth sensing unit.

Further, in some embodiments, the ultrasonic sensing element includes four second dummy sensing units, and the four second dummy sensing units are on four sides of the first dummy sensing unit respectively, and are symmetrically arranged.

Further, in some embodiments, areas of the second dummy sensing units are smaller than those of the first sensing unit, the second sensing unit, the third sensing unit, and the fourth sensing unit.

An ultrasonic sensing element is further provided herein. The ultrasonic sensing element for a wafer edge detection apparatus includes a semiconductor substrate, a first sensing module, a second sensing module, four connection pads, and four welding pads.

The semiconductor substrate includes a first surface and a second surface. The first sensing module is on the first surface of the semiconductor substrate, and includes a first sensing unit and a second sensing unit. The first sensing unit is connected in parallel to the second sensing unit. The second sensing module is on the first surface of the semiconductor substrate, and includes a third sensing unit and a fourth sensing unit. The third sensing unit is connected in parallel to the fourth sensing unit. The first sensing unit, the second sensing unit, the third sensing unit and the fourth sensing unit are in four corners of the first surface of the semiconductor substrate respectively, and are symmetrically arranged.

Each of the connection pads is between two of the first sensing unit, the second sensing unit, the third sensing unit, and the fourth sensing unit and in a through hole passing through the first surface and the second surface of the semiconductor substrate. Two of the connection pads are connected to the first sensing module through lines, and the other two are connected to the second sensing module through lines. The four welding pads are on the second surface of the semiconductor substrate, and overlap vertical projections of the first sensing unit, the second sensing unit, the third sensing unit, and the fourth sensing unit respectively. Each of the welding pads is connected to one of the four connection pads through a line.

In some embodiments, the first sensing unit, the second sensing unit, the third sensing unit, and the fourth sensing unit are piezoelectric micromachined ultrasonic transducers.

In some embodiments, each of connection pads is between two of the welding pads, and the two welding pads are symmetrically arranged with the connection pad as a center.

In some embodiments, the ultrasonic sensing element further includes a first dummy sensing unit, and the first dummy sensing unit is in a center of the first surface of the semiconductor substrate. In more detail, in some embodiments, an area of the first dummy sensing unit is smaller than those of the first sensing unit, the second sensing unit, the third sensing unit, and the fourth sensing unit.

In more detail, in some embodiments, the ultrasonic sensing element further includes a plurality of second dummy sensing units, and each of the second dummy sensing units is between two of the first sensing unit, the second sensing unit, the third sensing unit, and the fourth sensing unit.

Further, in some embodiments, the ultrasonic sensing element includes four second dummy sensing units, and the four second dummy sensing units are on four sides of the first dummy sensing unit respectively, and are symmetrically arranged.

Further, in some embodiments, areas of the second dummy sensing units are smaller than those of the first sensing unit, the second sensing unit, the third sensing unit, and the fourth sensing unit.

As shown in the foregoing embodiments, the connection pads are manufactured by using a through hole technology, and the sensing units and the welding pads can be regularly arranged, so that utilization of a wafer can be optimized, and manufacturing and detection of the sensing units are facilitated better. In addition, an array manner may be used for selection and cutting based on an actual requirement, so that a same wafer may be cut based on different product requirements, to achieve custom effects.

DETAILED DESCRIPTION

It is to be understood that when an element is referred to as being "disposed" on another element, it may indicate that the element is directly on the another element, or there may be an intermediate element, and the element is connected to the another element through the intermediate element. On the contrary, when an element is referred to as "being directly disposed on another element" or "being directly disposed at another element", it may be understood that there is definitely no intermediate element.

In addition, terms such as "first", "second", and "third" are used only to distinguish between an element, component, region, layer, or part and another element, component, region, layer, or part, and do not indicate a necessary order. In addition, a relative term, for example, "lower" and "upper", may be used herein to describe a relationship between an element and another element. It is to be understood that the relative term is intended to include an orientation of an apparatus different from an orientation shown in the figure. For example, if an apparatus in an accompanying drawing is overturned, an element that is described as being on a "lower" side of another element is oriented to be on an "upper" side of the another element. This indicates not an absolute orientation relationship but only a relative orientation relationship.

Figure 1:
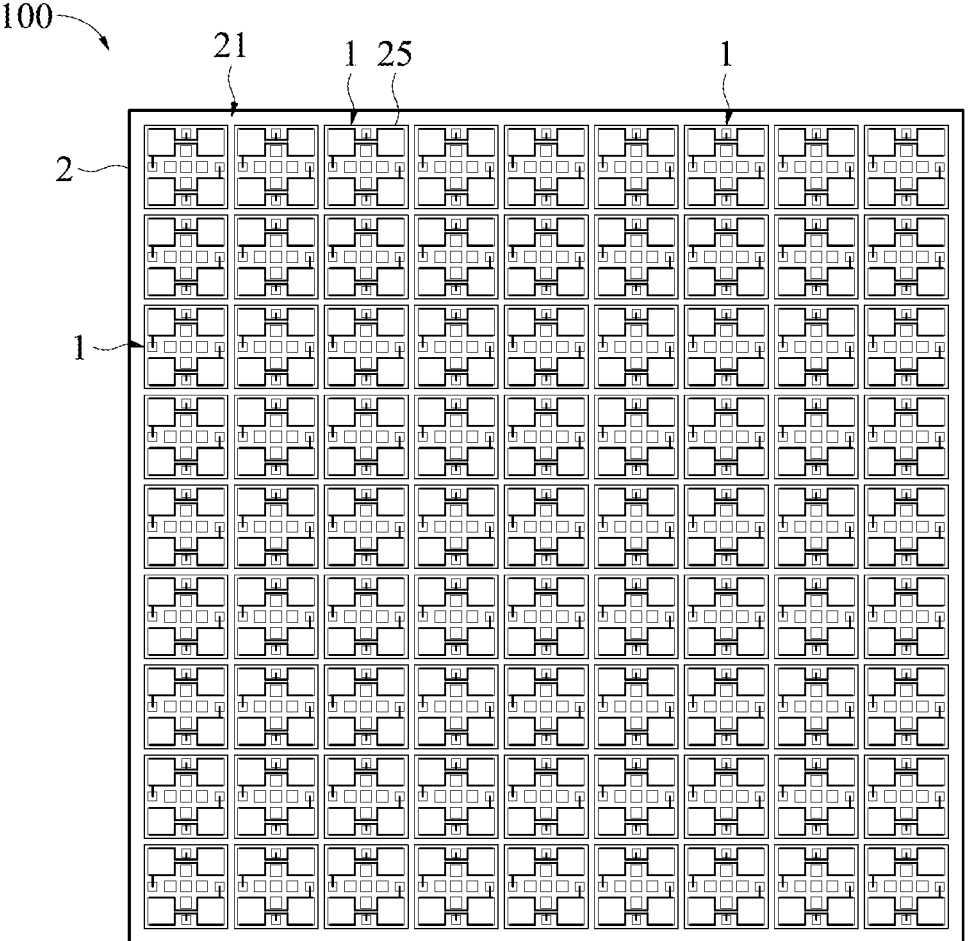
FIG. 1 is a top view of an ultrasonic sensing element assembly.
Figure 2:
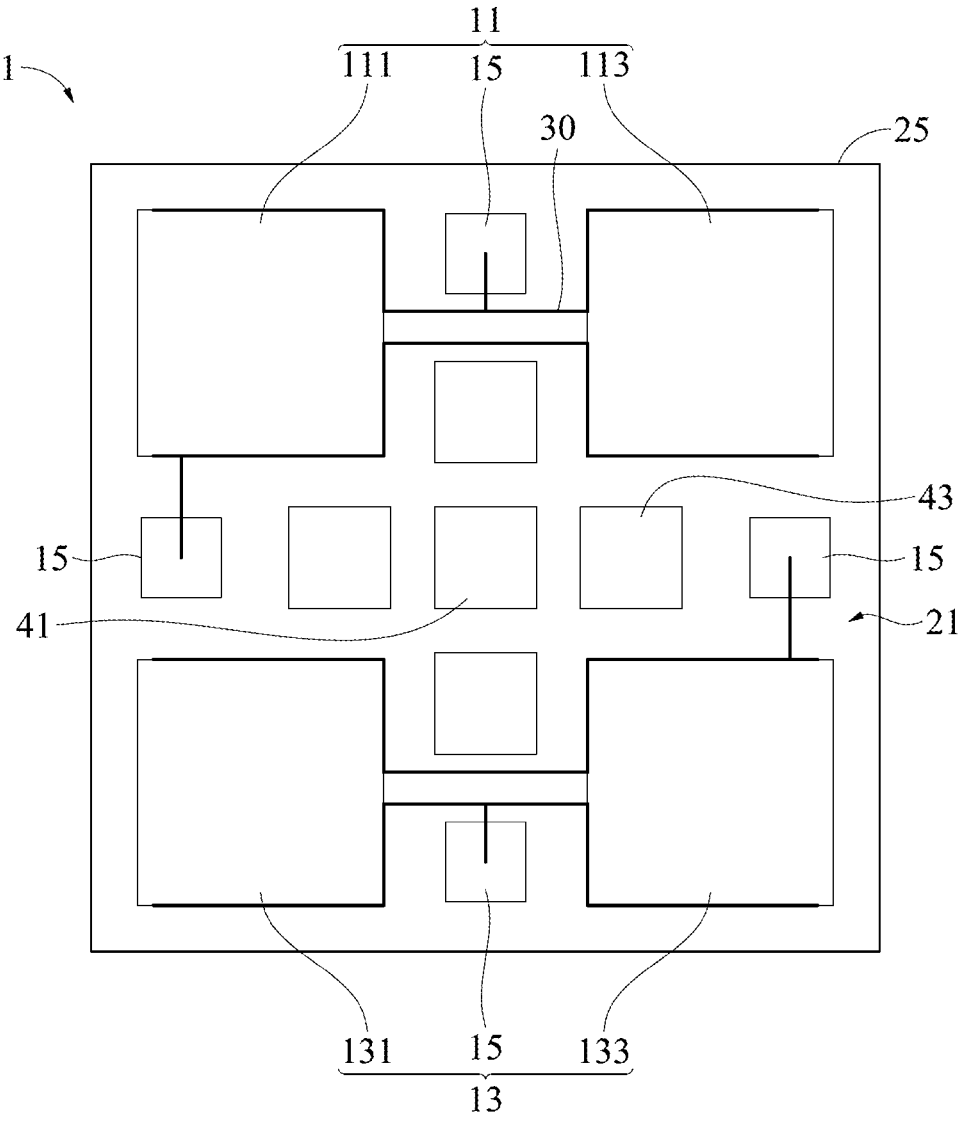
FIG. 2 is a top view of an embodiment of an ultrasonic sensing element.
Figure 3:
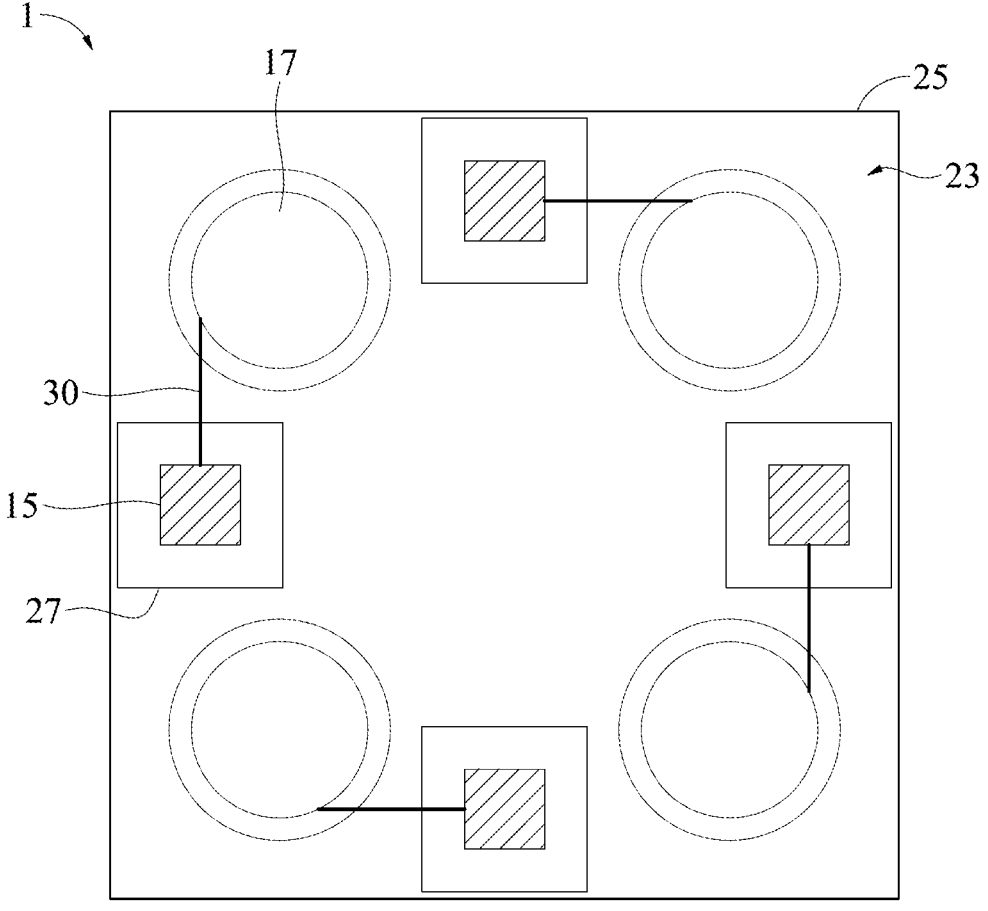
FIG. 3 is a bottom view of an embodiment of an ultrasonic sensing element.

FIG. 1 is a top view of an ultrasonic sensing element assembly. FIG. 2 is a top view of an embodiment of an ultrasonic sensing element. FIG. 3 is a bottom view of an embodiment of an ultrasonic sensing element. As shown in FIG. 1, the ultrasonic sensing element assembly 100 includes a plurality of ultrasonic sensing elements 1 and a semiconductor substrate 2. Herein, the semiconductor substrate 2 may be a silicon wafer. The ultrasonic sensing elements 1 are formed on the semiconductor substrate 2 in an array. The semiconductor substrate 2 includes a first surface 21 and a second surface 23.

Each of the ultrasonic sensing elements 1 is in a sensing region 25 of the semiconductor substrate 2. As shown in FIG. 2 and FIG. 3, each of the ultrasonic sensing elements 1 includes a first sensing module 11, a second sensing module 13, four connection pads 15, and four welding pads 17. The first sensing module 11 is on the first surface 21 of the sensing region 25, and includes a first sensing unit 111 and a second sensing unit 113. The first sensing unit 111 is connected in parallel to the second sensing unit 113. The second sensing module 13 is on the first surface 21 of the sensing region 25, and includes a third sensing unit 131 and a fourth sensing unit 133. The third sensing unit 131 is connected in parallel to the fourth sensing unit 133. The first sensing unit 111, the second sensing unit 113, the third sensing unit 131, and the fourth sensing unit 133 are in four corners of the first surface 21 of the sensing region 25 respectively, and are symmetrically arranged.

Each of the connection pads 15 is between two of the first sensing unit 111, the second sensing unit 113, the third sensing unit 131, and the fourth sensing unit 133 and in a through hole 27 passing through the first surface 21 and the second surface 23 of the sensing region 25. Two of the connection pads 15 are connected to the first sensing module 11 through lines 30, and are connected to a positive electrode and a negative electrode of the first sensing module 11 respectively, and the other two are connected to the second sensing module 13 through lines 30, and are connected to a positive electrode and a negative electrode of the second sensing module 13 respectively. The four welding pads 17 are on the second surface 23 of the sensing region 25 and overlap vertical projections of the first sensing unit 111, the second sensing unit 113, the third sensing unit 131, and the fourth sensing unit 133 respectively. To be specific, the four welding pads 17 are under the first sensing unit 111, the second sensing unit 113, the third sensing unit 131, and the fourth sensing unit 133. Each of the welding pads 17 is connected to one of the four connection pads 15 through a line 30. In this way, the first sensing unit 111, the second sensing unit 113, the third sensing unit 131, and the fourth sensing unit 133 are electrically connected to elements, for example, a circuit board, connected to the welding pads 17 via the welding pads 17 and the connection pads 15.

Referring to FIG. 1 again, the ultrasonic sensing element assembly 100 is essentially a part of a layout of a wafer integrated circuit. The ultrasonic sensing elements 1 are symmetrically arranged in an array, so that the wafer integrated circuit may essentially be cut based on a product requirement in a manner of one ultrasonic sensing element 1 or a plurality of ultrasonic sensing elements 1, for example, 1×2 or 2×4. In this way, a same wafer can meet different product requirements, so that utilization of the wafer is greatly improved. After the wafer is cut, the sensing region 25 with the ultrasonic sensing element 1 is a substrate of the element. The ultrasonic sensing element 1 is a minimum cutting size.

Herein, the first sensing unit 111, the second sensing unit 113, the third sensing unit 131, and the fourth sensing unit 133 are piezoelectric ultrasonic sensors, for example, piezoelectric micromachined ultrasonic transducers (PMUTs).

Referring to FIG. 3 again, in some embodiments, each of the connection pads 15 is between two of the welding pads 17, and the two welding pads 17 are symmetrically arranged with the connection pad 15 as a center. A symmetric arrangement structure facilitates overall layout and subsequent encapsulation and detection better.

Figure 4:
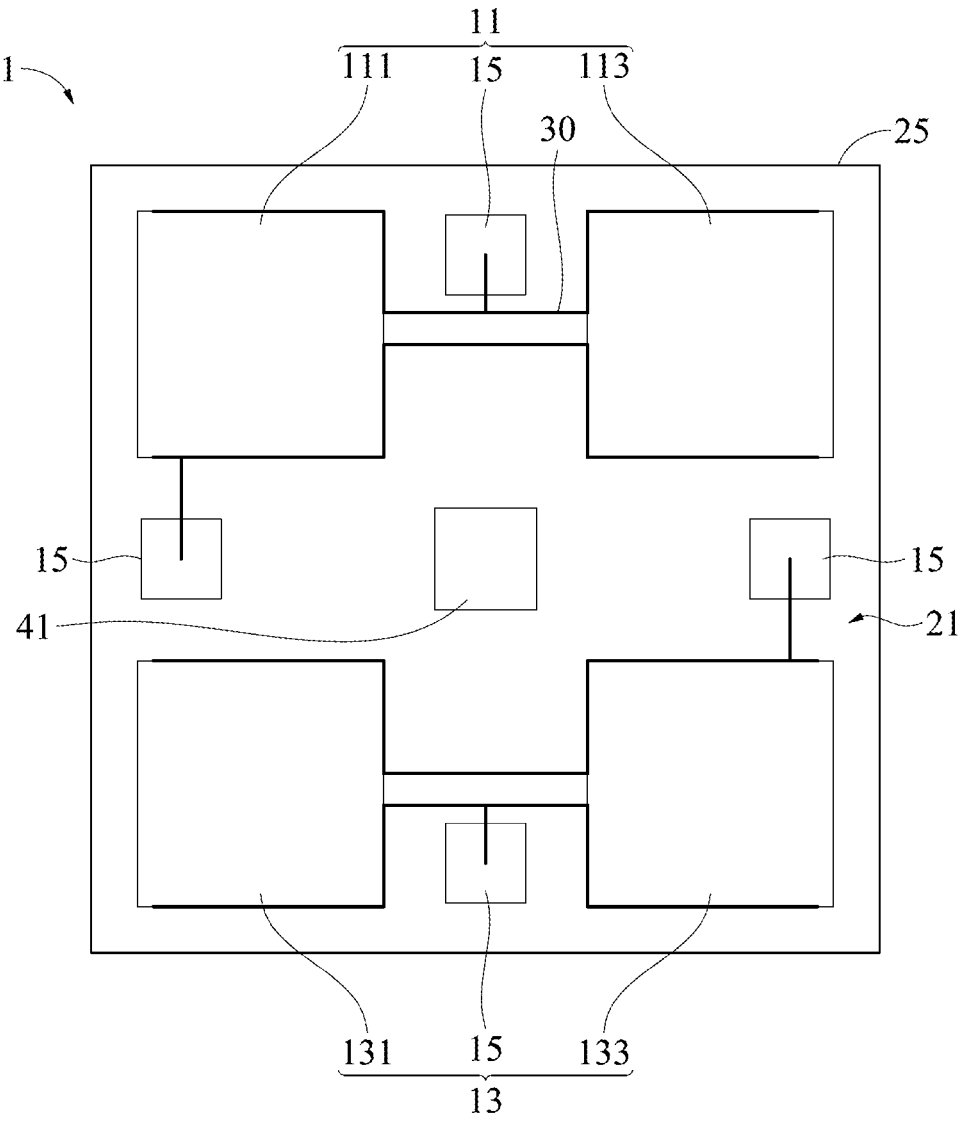
FIG. 4 is a top view of another embodiment of an ultrasonic sensing element.

FIG. 4 is a top view of another embodiment of an ultrasonic sensing element. As shown in FIG. 4, in this embodiment, the ultrasonic sensing element 1 further includes a first dummy sensing unit 41. The first dummy sensing unit 41 is in a center of the first surface 21 of the sensing region 25. In more detail, an area of the first dummy sensing unit 41 is smaller than those of the first sensing unit 111, the second sensing unit 113, the third sensing unit 131, and the fourth sensing unit 133. The first dummy sensing unit 41 may be manufactured together with the first sensing unit 111, the second sensing unit 113, the third sensing unit 131, and the fourth sensing unit 133, but is not connected to the welding pad 17. Substantially like the first sensing unit 111, the second sensing unit 113, the third sensing unit 131, and the fourth sensing unit 133 in structure, the first dummy sensing unit 41 has a cavity, so that the first dummy sensing unit 41 may function in positioning, noise filtering, crosstalk reduction, and bandwidth supplementation.

Figure 5:
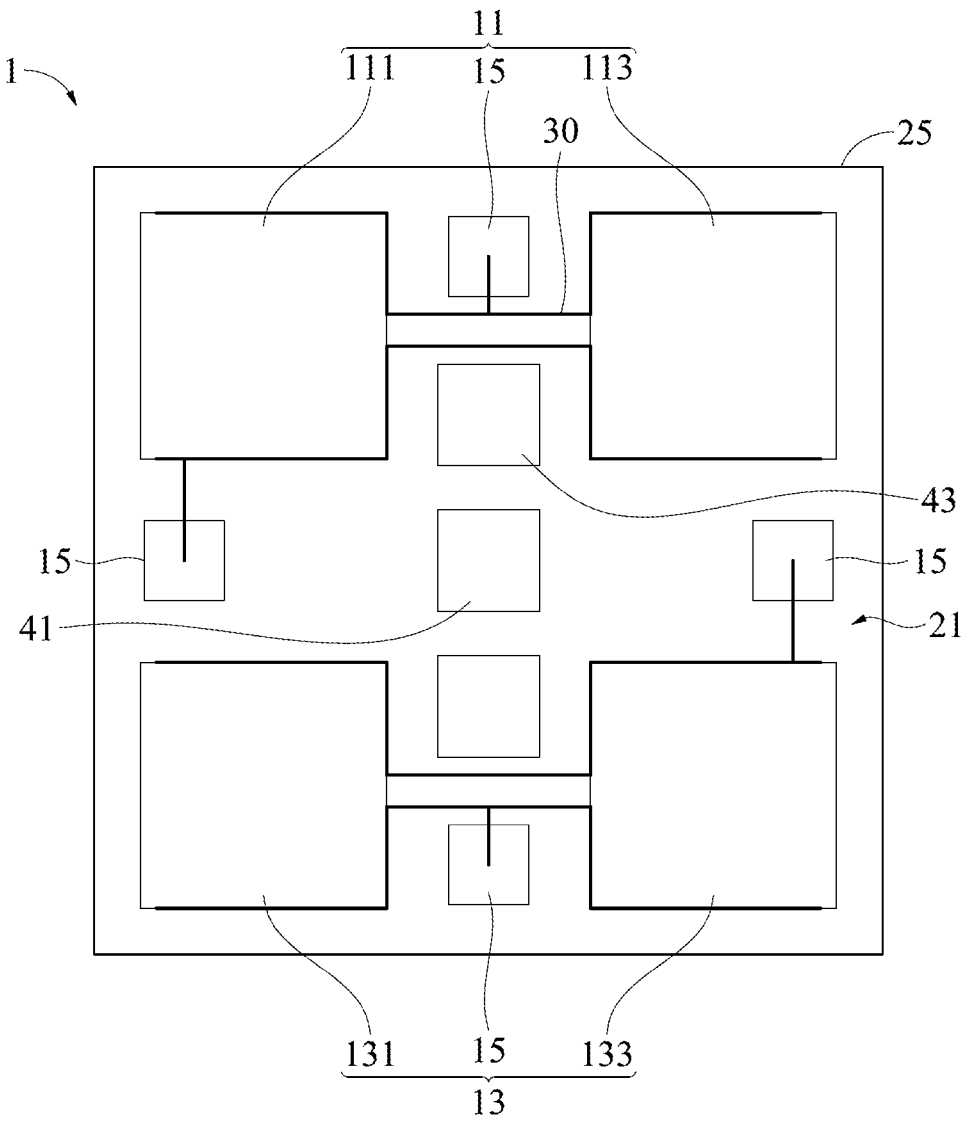
FIG. 5 is a top view of still another embodiment of an ultrasonic sensing element.

FIG. 5 is a top view of still another embodiment of an ultrasonic sensing element. As shown in FIG. 5, the ultrasonic sensing element 1 further includes a plurality of second dummy sensing units 43. For example, there are two second dummy sensing units 43 herein. The second dummy sensing units 43 are between the first sensing unit 111 and the second sensing unit 113 and between the third sensing unit 131 and the fourth sensing unit 133 respectively. This is merely an example instead of a limitation. The second dummy sensing unit 43 is structurally and functionally similar to the first dummy sensing unit 41. Similarly, an area of the second dummy sensing unit 43 is smaller than those of the first sensing unit 111, the second sensing unit 113, the third sensing unit 131 and the fourth sensing unit 133.

Referring to FIG. 2 again, in some embodiments, the ultrasonic sensing element 1 includes four second dummy sensing units 43. The four second dummy sensing units 43 are on four sides of the first dummy sensing unit 41 respectively, and are symmetrically arranged. A quantity and arrangement of the second dummy sensing units 43 are merely an example instead of a limitation.

In summary, the connection pads 15 are manufactured by using the through hole technology, and the sensing units 111, 113, 131 and 133 and the welding pads 17 are regularly arranged, so that the utilization of the wafer can be optimized, and manufacturing and detection of the sensing units 111, 113, 131 and 133 are facilitated better. In addition, an array manner may be used for selection and cutting based on an actual requirement, so that the same wafer may be cut based on different product requirements, to achieve custom effects.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An ultrasonic sensing element assembly, comprising:
a semiconductor substrate comprising a first surface and a second surface; and
a plurality of ultrasonic sensing elements on the semiconductor substrate and arranged in an array, wherein each of the ultrasonic sensing elements is in a sensing region of the semiconductor substrate, and each of the ultrasonic sensing elements comprises:
a first sensing module on the first surface of the sensing region and comprising a first sensing unit and a second sensing unit, wherein the first sensing unit is connected in parallel to the second sensing unit;
a second sensing module on the first surface of the sensing region and comprising a third sensing unit and a fourth sensing unit, wherein the third sensing unit is connected in parallel to the fourth sensing unit, and the first sensing unit, the second sensing unit, the third sensing unit, and the fourth sensing unit are in four corners of the first surface of the sensing region respectively, and are symmetrically arranged;
four connection pads, wherein each of the connection pads is between two of the first sensing unit, the second sensing unit, the third sensing unit, and the fourth sensing unit and in a through hole passing through the first surface and the second surface of the sensing region, two of the connection pads are connected to the first sensing module through lines, and the other two are connected to the second sensing module through lines; and
four welding pads on the second surface of the sensing region, overlapping vertical projections of the first sensing unit, the second sensing unit, the third sensing unit, and the fourth sensing unit respectively, wherein each of the welding pads is connected to one of the four connection pads through a line.

2. The ultrasonic sensing element assembly according to claim 1, wherein the first sensing unit, the second sensing unit, the third sensing unit, and the fourth sensing unit are piezoelectric micromachined ultrasonic transducers (PMUTs).

3. The ultrasonic sensing element assembly according to claim 1, wherein each of the connection pads is between two of the welding pads, and the two welding pads are symmetrically arranged with the connection pad as a center.

4. The ultrasonic sensing element assembly according to claim 1, wherein each of the ultrasonic sensing elements further comprises a first dummy sensing unit, and the first dummy sensing unit is in a center of the first surface of the sensing region.

5. The ultrasonic sensing element assembly according to claim 4, wherein an area of the first dummy sensing unit is smaller than those of the first sensing unit, the second sensing unit, the third sensing unit, and the fourth sensing unit.

6. The ultrasonic sensing element assembly according to claim 4, wherein each of the ultrasonic sensing elements further comprises a plurality of second dummy sensing units, and each of the second dummy sensing units is between two of the first sensing unit, the second sensing unit, the third sensing unit, and the fourth sensing unit.

7. The ultrasonic sensing element assembly according to claim 6, wherein each of the ultrasonic sensing elements comprises four second dummy sensing units, and the four second dummy sensing units are on four sides of the first dummy sensing unit respectively, and are symmetrically arranged.

8. The ultrasonic sensing element assembly according to claim 6, wherein areas of the second dummy sensing units are smaller than those of the first sensing unit, the second sensing unit, the third sensing unit, and the fourth sensing unit.

9. An ultrasonic sensing element, comprising:
  a semiconductor substrate, comprising a first surface and a second surface;
  a first sensing module on the first surface of the semiconductor substrate and comprising a first sensing unit and a second sensing unit, wherein the first sensing unit is connected in parallel to the second sensing unit;
  a second sensing module on the first surface of the semiconductor substrate and comprising a third sensing unit and a fourth sensing unit, wherein the third sensing unit is connected in parallel to the fourth sensing unit, and the first sensing unit, the second sensing unit, the third sensing unit, and the fourth sensing unit are in four corners of the first surface of the semiconductor substrate respectively, and are symmetrically arranged;
  four connection pad, wherein each of the connection pads is between two of the first sensing unit, the second sensing unit, the third sensing unit, and the fourth sensing unit and in a through hole passing through the first surface and the second surface of the semiconductor substrate, two of the connection pads are connected to the first sensing module through lines, and the other two are connected to the second sensing module through lines; and four welding pads on the second surface of the semiconductor substrate, overlapping vertical projections of the first sensing unit, the second sensing unit, the third sensing unit, and the fourth sensing unit respectively, wherein each of the welding pads is connected to one of the four connection pads through a line.

10. The ultrasonic sensing element according to claim 9, wherein the first sensing unit, the second sensing unit, the third sensing unit, and the fourth sensing unit are piezoelectric micromachined ultrasonic transducers.

11. The ultrasonic sensing element according to claim 9, wherein each of the connection pads is between two of the welding pads, and the two welding pads are symmetrically arranged with the connection pad as a center.

12. The ultrasonic sensing element according to claim 9, further comprising a first dummy sensing unit, wherein the first dummy sensing unit is in a center of the first surface of the semiconductor substrate.

13. The ultrasonic sensing element according to claim 12, wherein an area of the first dummy sensing unit is smaller than those of the first sensing unit, the second sensing unit, the third sensing unit, and the fourth sensing unit.

14. The ultrasonic sensing element according to claim 12, further comprising a plurality of second dummy sensing units, wherein each of the second dummy sensing units is between two of the first sensing unit, the second sensing unit, the third sensing unit, and the fourth sensing unit.

15. The ultrasonic sensing element according to claim 14, comprising four second dummy sensing units, wherein the four second dummy sensing units are on four sides of the first dummy sensing unit respectively, and are symmetrically arranged.

16. The ultrasonic sensing element according to claim 14, wherein areas of the second dummy sensing units are smaller than those of the first sensing unit, the second sensing unit, the third sensing unit, and the fourth sensing unit.

\* \* \* \* \*